(12) United States Patent
Sikavi

(10) Patent No.: US 11,459,093 B2
(45) Date of Patent: Oct. 4, 2022

(54) WINGLET AIRFOILS

(71) Applicant: Aviation Partners, Inc., Seattle, WA (US)

(72) Inventor: Danny A. Sikavi, Redmond, WA (US)

(73) Assignee: Aviation Partners, Inc., Seattle, WA (US)

( * ) Notice: Subject to any disclaimer, the term of this patent is extended or adjusted under 35 U.S.C. 154(b) by 809 days.

(21) Appl. No.: 16/283,674

(22) Filed: Feb. 22, 2019

(65) Prior Publication Data

US 2019/0256197 A1    Aug. 22, 2019

Related U.S. Application Data

(60) Provisional application No. 62/634,171, filed on Feb. 22, 2018.

(51) Int. Cl.
*B64C 23/06* (2006.01)
*G06F 30/15* (2020.01)

(52) U.S. Cl.
CPC ............ *B64C 23/069* (2017.05); *G06F 30/15* (2020.01)

(58) Field of Classification Search
CPC .............................. B64C 23/069; G06F 30/15
USPC ............................................................ 703/8
See application file for complete search history.

(56) References Cited

U.S. PATENT DOCUMENTS

| | | | |
|---|---|---|---|
| 1,893,064 A | 1/1933 | Zaparka | |
| 2,562,227 A | 7/1951 | Zobel | |
| 4,813,631 A | 3/1989 | Gratzer | |
| 4,867,396 A | 9/1989 | Wainfan | |
| 5,076,516 A | 12/1991 | Wheat et al. | |
| 5,088,665 A | 2/1992 | Vijgen et al. | |
| 5,265,830 A | 11/1993 | Allen | |
| 6,565,045 B1 | 5/2003 | Correge et al. | |
| 8,231,084 B2 | 7/2012 | Wright | |
| 2004/0135032 A1 | 7/2004 | Gregg et al. | |
| 2007/0114329 A1 | 5/2007 | Lacy et al. | |
| 2013/0134265 A1 | 5/2013 | Rolt et al. | |

(Continued)

OTHER PUBLICATIONS

Charles A. Mader et al., ADjoint: An Approach for the Rapid Development of Discrete Adjoint Solvers, AIAA Journal vol. 46, No. 4, Apr. 2008. p. 1-11. (Year: 2008).*

(Continued)

*Primary Examiner* — Justin C Mlikowski
(74) *Attorney, Agent, or Firm* — Rutan & Tucker LLP

(57) ABSTRACT

A system and method for optimizing winglet airfoil geometries in the presence of interference conditions at cruise Mach speeds. The method includes performing a first analysis on the airfoil at a first Mach speed and a second Mach speed greater than the first Mach speed. The analyses provide resultant values that can include any one or more of a coefficient of lift (CL), a coefficient of drag (CD), and a coefficient of pressure (CP). A desired pressure distribution curve on the airfoil can be specified based on the resultant values. An inverse analysis can then be performed to derive a modified airfoil geometry that corresponds to the desired pressure distribution. The modified airfoil geometry can be incorporated into a blended winglet and analyzed by way of running a CFD++ code to verify improved airfoil performance in a full airplane geometry.

11 Claims, 9 Drawing Sheets

(56) References Cited

U.S. PATENT DOCUMENTS

2019/0185138 A1 6/2019 Lauk
2019/0256188 A1 8/2019 Sikavi

OTHER PUBLICATIONS

Ubaldo Cella and Marco Evangelos Biancolini, Aeroelastic Analysis of Aircraft Wind-Tunnel Model Coupling Structural and Fluid Dynamic Codes, Journal of Aircraft, vol. 49, No. 2, Mar.-Apr. 2012. (Year: 2012).*
Sagar Deshpande et al., CFD Simulations of Horizontal Axis Wind Turbine (HAWT) Blades for Variation With Wind Speed, 2nd National Conference on CFD Applications in Power and Industry Sectors Jan. 28-29, 2009, Hydrabad, India. (Year: 2009).*
Md Akhtar Khan, et al., Effect of Spikes Integrated to Airfoil at Supersonic Speed, IJRET: International Journal of Research in Engineering and Technology eISSN: 2319-1163, vol. 03 Issue: 10 | Oct. 2014, pp. 226-238. (Year: 2014).*
U.S. Appl. No. 16/283,546, filed Feb. 22, 2019 Non-Final Office Action dated Nov. 23, 2020.

* cited by examiner

WINGLET AIRFOILS

PRIORITY

This application claims the benefit of priority to U.S. Provisional Application No. 62/634,171, filed on Feb. 22, 2018, which is incorporated by reference in its entirety into this application.

FIELD

Embodiments of the present disclosure generally relate to the field of airfoils. More specifically, embodiments of the disclosure relate to systems and methods for optimizing winglet airfoil geometry.

BACKGROUND

The primary lifting surface of an aircraft is its wing, which has a cross-sectional shape called an airfoil. The airfoil of the wing moved through air produces an aerodynamic force. The component of this force perpendicular to the direction of motion is called lift, and parallel to the direction of motion is called drag. Subsonic flight airfoils have a characteristic shape with a rounded leading edge, followed by a sharp trailing edge, often with a symmetric curvature of upper and lower surfaces. Most modern transport and business jets cruise in the transonic flow regime ($0.70 \leq MACH \leq 1.0$). Under this type of flight condition the aircraft wing generates shocks, from its constituent airfoils on the upper lifting surfaces.

With respect to a blended winglet (see, e.g., U.S. Pat. Nos. 5,348,253 and 9,381,999, each of which is incorporated by reference into this application) and a split winglet (see, e.g., U.S. Pat. Nos. 8,944,386 and 9,302,766, each of which is incorporated by reference into this application), the shock fronts extend vertically from the wing surface and interfere with the flow field of the winglet. The nature of this interference exhibits itself in higher Mach numbers for the flow fields to which the winglets are subjugated. As such, a need exists for methods whereby optimal winglet airfoil geometries may be determined in the presence of interference conditions at cruise Mach speeds.

SUMMARY

A method is provided for optimizing winglet airfoil geometries in the presence of interference conditions at cruise Mach speeds. The method includes performing a first analysis on the airfoil at a first Mach speed and then performing a second analysis on the airfoil at a second Mach speed. Performing the second analysis includes selecting the second Mach speed to be greater than the first Mach speed. The second analysis provides one or more resultant values of any one or more of a coefficient of lift (CL), a coefficient of drag (CD), and a coefficient of pressure (CP) at the second Mach speed. A desired pressure distribution curve on an upper surface and a lower surface of the airfoil may be specified based on the resultant values obtained by way of the second analysis. An inverse analysis may be performed on the desired pressure distribution to derive a modified airfoil geometry that corresponds to the desired pressure distribution. A third analysis may then be performed on the modified airfoil geometry in the presence of interference at the first Mach speed. The modified airfoil geometry may be incorporated into a blended winglet and analyzed by way of running a CFD++ code to verify improved airfoil performance in a full airplane geometry.

In an exemplary embodiment, a computerized method for optimizing an airfoil comprises: performing a first analysis, by way of a first logic module, on the airfoil at a first Mach speed; performing a second analysis, by way of a second logic module, on the airfoil at a second Mach speed; receiving input, by way of an inverse analysis logic module, indicating a desired pressure distribution at the second Mach speed; performing an inverse analysis, by way of the inverse analysis logic module, to derive a modified airfoil geometry corresponding to the desired pressure distribution; performing a third analysis, by way of a third logic module, on the modified airfoil geometry in the presence of interference at the first Mach speed; and generating a blended winglet geometry that incorporates the modified airfoil geometry.

In another exemplary embodiment, performing the first analysis includes selecting the first Mach speed to be a speed at which the airfoil generates shocks. In another exemplary embodiment, performing the second analysis includes selecting the second Mach speed to be greater than the first Mach speed. In another exemplary embodiment, selecting comprises selecting the second Mach speed to be substantially +0.04 greater the first Mach speed.

In another exemplary embodiment, performing the first analysis includes obtaining values for any one or more of a coefficient of lift (CL), a coefficient of drag (CD), and a coefficient of pressure (CP) at the first Mach speed. In another exemplary embodiment, performing the first analysis includes determining a pressure distribution on an upper surface and a lower surface of the airfoil at the first Mach speed.

In another exemplary embodiment, performing the second analysis includes obtaining values for any one or more of a coefficient of lift (CL), a coefficient of drag (CD), and a coefficient of pressure (CP) at the second Mach speed. In another exemplary embodiment, performing the second analysis includes determining a pressure distribution on an upper surface and a lower surface of the airfoil at the second Mach speed.

In another exemplary embodiment, inputting further comprises specifying a pressure distribution curve on an upper surface and a lower surface of the airfoil such that pressure distribution curve is shock-free at the second Mach speed. In another exemplary embodiment, specifying the pressure distribution curve comprises utilizing one or more resultant values of second analysis. In another exemplary embodiment, the one or more resultant values comprise any one or more of a coefficient of lift (CL), a coefficient of drag (CD), and a coefficient of pressure (CP) at the second Mach speed.

In another exemplary embodiment, the method further comprises performing a third analysis on the modified airfoil geometry in the presence of interference at the first Mach speed. In another exemplary embodiment, performing the third analysis comprises performing a pressure distribution analysis on a blended winglet that includes the modified airfoil. In another exemplary embodiment, performing the third analysis comprises running a CFD++ code. In another exemplary embodiment, performing the third analysis comprises running the CFD++ code with the blended winglet incorporated into a full airplane geometry.

In an exemplary embodiment, a method for optimizing a winglet airfoil comprises: performing an analysis on the winglet airfoil at a first Mach number to determine at least the coefficient of lift (CL), the coefficient of drag (CD), and the coefficient of pressure (CP) at the first Mach number; performing an analysis on the winglet airfoil at a second Mach number greater than the first Mach number to determine at least the coefficient of lift (CL), the coefficient of drag (CD), and the coefficient of pressure (CP) at the second Mach number; selecting a pressure distribution curve at the second Mach number; and running an inverse pressure distribution from the pressure distribution curve to generate geometry for a modified winglet airfoil. In another exemplary embodiment, the method further comprises subjecting the modified winglet airfoil to interference at the first Mach number.

In an exemplary embodiment, a system for optimizing an airfoil comprises: a memory to store executable instructions; and a processing device coupled with the memory, wherein the instructions, when executed by the processing device, cause operations including: performing, by a first logic module, a first analysis on the airfoil at a first Mach speed; performing, by a second logic module, a second analysis on the airfoil at a second Mach speed; receiving, by an inverse analysis logic module, input indicating a desired pressure distribution at the second Mach speed; performing, by the inverse analysis logic module, an inverse analysis to derive a modified airfoil geometry corresponding to the desired pressure distribution; and performing, by a third logic module, a third analysis on the modified airfoil geometry in the presence of interference at the first Mach speed.

In another exemplary embodiment, the second Mach speed is substantially +0.04 greater the first Mach speed. In another exemplary embodiment, the third analysis comprises a pressure distribution analysis on a blended winglet that includes the modified airfoil. In another exemplary embodiment, the third analysis comprises using a CFD++ code. In another exemplary embodiment, the third analysis comprises running the CFD++ code with the blended winglet incorporated into a full airplane geometry.

The inventive aspects described herein are applicable to wings of an aircraft and other wing-like devices without limitation. For example, the inventive aspects described herein can be incorporated into embodiments disclosed in U.S. Pat. Nos. 9,381,999; 8,944,386; 9,038,963; 9,302,766; 10,710,702; and WO 2017/176583, each of which is incorporated by reference in its entirety into this application.

BRIEF DESCRIPTION OF THE DRAWINGS

The drawings refer to embodiments of the present disclosure in which.

Figure 1:
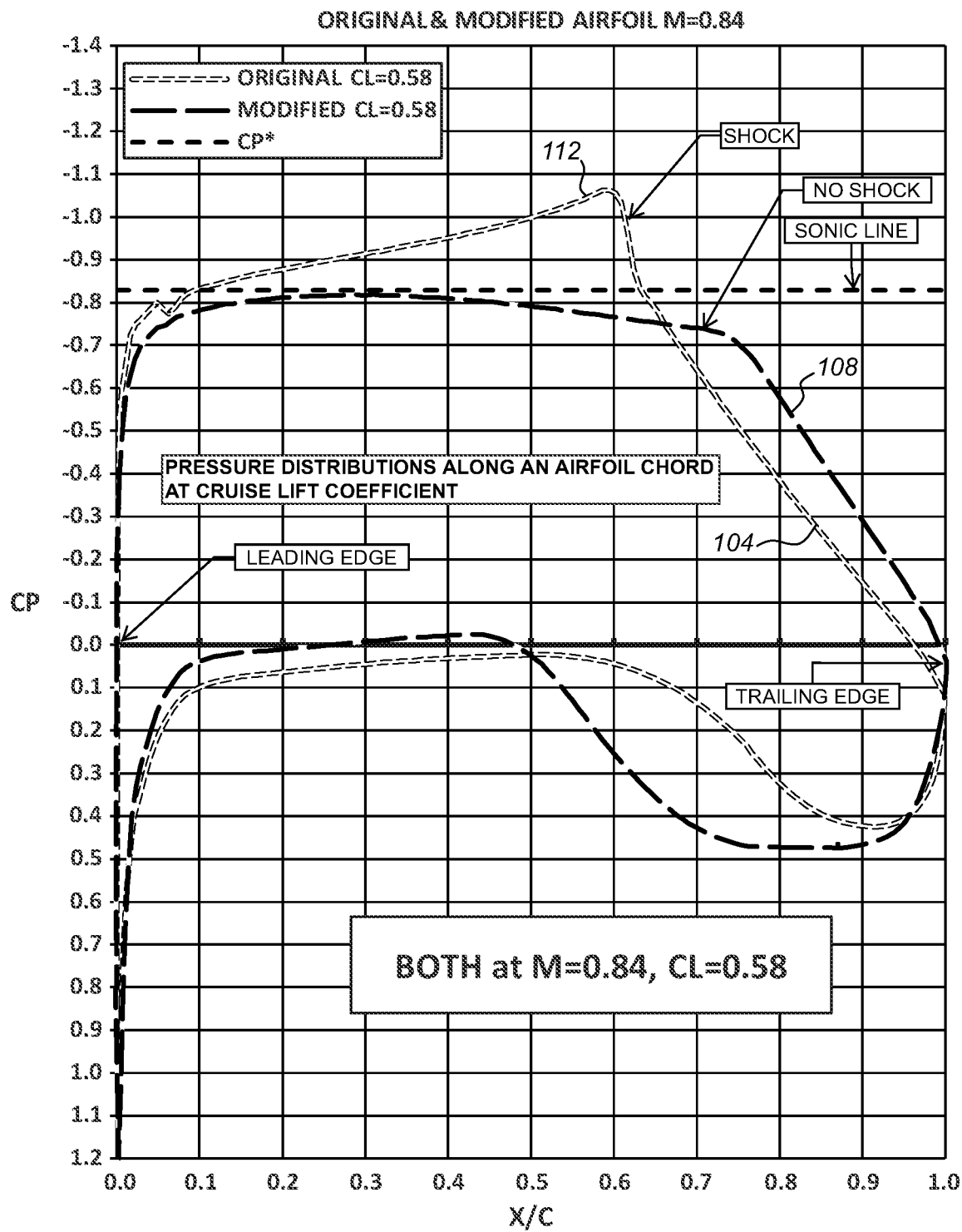
FIG. 1 is a graph illustrating performance data for an original airfoil and a modified airfoil at first Mach speed.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

Before some particular embodiments are provided in greater detail, it should be understood that the particular embodiments provided herein do not limit the scope of the concepts provided herein. It should also be understood that a particular embodiment provided herein can have features that can be readily separated from the particular embodiment and optionally combined with or substituted for features of any of a number of other embodiments provided herein.

In the following description, certain terminology is used to describe features of the invention. For example, in certain situations, the term "logic" and "component" are representative of hardware, firmware or software that is configured to perform one or more functions. As hardware, a component (or logic) may include circuitry having data processing or storage functionality. Examples of such circuitry may include, but are not limited or restricted to, a hardware processor (e.g., microprocessor with one or more processor cores, a digital signal processor, a programmable gate array, a microcontroller, an application specific integrated circuit "ASIC," etc.), a semiconductor memory, or combinatorial elements.

Alternatively, the component (or logic) may be software, such as executable code in the form of an executable application, an Application Programming Interface (API), a subroutine, a function, a procedure, an applet, a servlet, a routine, source code, object code, a shared library/dynamic load library, or one or more instructions. The software may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; semiconductor memory; non-persistent storage such as volatile memory (e.g., any type of random access memory "RAM"); or persistent storage such as non-volatile memory (e.g., read-only memory "ROM," power-backed RAM, flash memory, phase-change memory, etc.), a solid-state drive, hard disk drive, an optical disc drive, or a portable memory device. As firmware, the executable code may be stored in persistent storage.

A "communication" generally refers to information transmitted in one or more electrical signals that collectively represent electrically stored data in a prescribed format. Each communication may be in the form of one or more packets, frames, HTTP-based transmissions, signals transmitted over telephone lines, or any other series of bits having the prescribed format. Herein, the terms "message," "communication" and "communication message" are used interchangeably. Specifically, the term "text message" refers to a communication transmitted to a phone number and transmitted via either a cellular data service provider (e.g., AT&T, Verizon, Sprint, etc.) or a set of private servers (e.g., privately owned or through cloud computing). Examples of text messages include, but are not limited or restricted to, short message service (SMS) messages and/or Apple iMessages®.

The term "computerized" generally represents that any corresponding operations are conducted by hardware in combination with software and/or firmware.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Lastly, unless indicated otherwise, ordinal numbers (e.g., first, second, third, etc.) are used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Most modern transport and business jets cruise in a transonic flow regime wherein aircraft wings are known to generate shocks from constituent airfoils on the upper lifting surfaces. Shock fronts extending vertically from the wing surfaces have been found to interfere with flow fields of blended winglets and split winglets. The nature of this interference exhibits itself in higher Mach numbers for the flow fields to which the winglets are subjugated. Embodiments presented herein include systems and methods whereby optimal winglet airfoil geometries may be determined in the presence of interference conditions at cruise Mach speeds.

Accordingly, a method based on computational fluid dynamics (CFD) is provided herein for optimizing winglet airfoil geometries in the presence of interference conditions at cruise Mach speeds. The method generally includes performing analyses on an airfoil at a first Mach speed and a second Mach speed. The second Mach speed is selected to be greater than the first Mach speed. The analyses provide resultant values that include any one or more of a coefficient of lift (CL), a coefficient of drag (CD), and a coefficient of pressure (CP). Once the resultant values are determined, a desired pressure distribution curve on the airfoil may be specified based on the resultant values. An inverse analysis may then be performed to derive a modified airfoil geometry that corresponds to the desired pressure distribution curve. The modified airfoil geometry may then be incorporated into a blended winglet and analyzed by way of running a CFD++ code to verify improved airfoil performance within a full airplane geometry.

FIG. 1 illustrates one exemplary embodiment wherein performance data pertaining to an original airfoil and a modified airfoil, both having a coefficient of lift of CL=0.58, are shown at a first Mach speed, M=0.84. The performance data include pressure distribution curves on an upper surface and a lower surface along a chord of the original airfoil and the modified airfoil. Specifically, an original curve 104 represents the pressure distribution along the chord of the original airfoil, and a modified curve 108 represents the pressure distribution along the chord of the modified airfoil. As will be appreciated, both curves 104, 108 are dependent upon performance data specific to the airfoil being analyzed.

It is contemplated that, in some embodiments, the modified curve 108 is obtained by manipulating the original curve 104 to minimize or eliminate shocks 112 that may be associated with the original airfoil. As will be appreciated, shocks 112 generally result in entropy losses and higher wave drag, thus hindering fuel economy. Accordingly, weakening the shocks 112 acting on the airfoil results in decreased wave drag, which may translate into reduced overall drag and better fuel efficiency. As shown in FIG. 1, manipulating curve 104 to eliminate the shocks 112 results in the modified curve 108 including a reduction in lift due to the upper surface and an equal increase in lift due to the lower surface of the modified airfoil.

Figure 2:
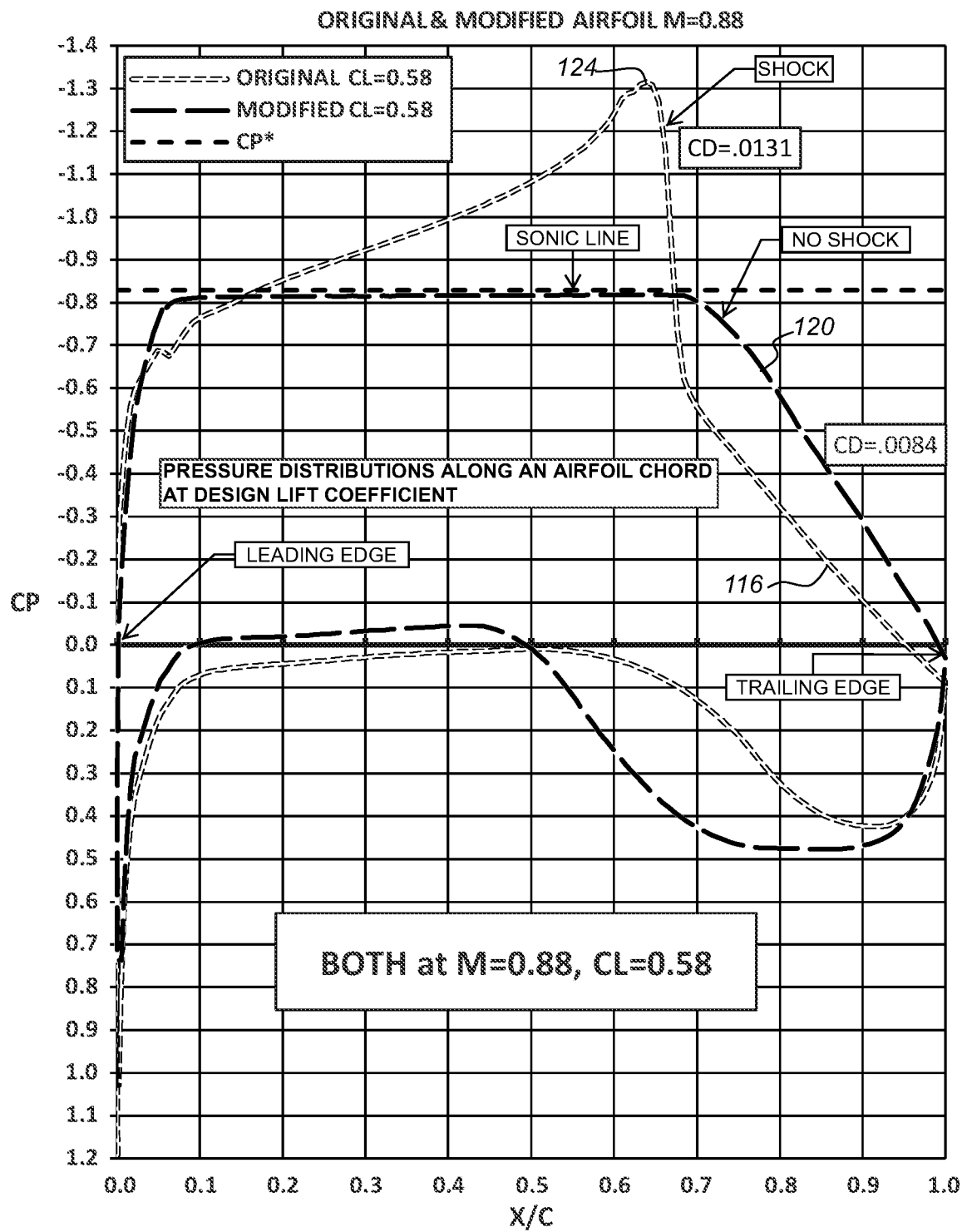
FIG. 2 is a graph illustrating performance data for the original airfoil and the modified airfoil at a second Mach speed that is greater than the first Mach speed of FIG. 1.

FIG. 2 illustrates an exemplary embodiment wherein the original airfoil of FIG. 1 is analyzed at a second Mach speed that is greater than the first Mach speed of FIG. 1. The analysis shown in FIG. 2 is similar to the analysis shown in FIG. 1, with the exception that the analysis of FIG. 2 is performed with the second Mach speed being M=0.88, thus comprising an increase of about +0.04 over the first Mach speed of M=0.84. Similar to the analysis of FIG. 1, the analysis of FIG. 2 includes an original curve 116 and a modified curve 120. The original curve 116 is a result of the performance of the original airfoil, and thus the curve 116 includes shocks 124. As will be appreciated, the shocks 124 produced by the original airfoil at the second Mach speed are relatively more pronounced than the shocks 112 produced at the first Mach speed of FIG. 1. Similar to the modified curve 108, shown in FIG. 1, the modified curve 120 may be obtained by manipulating the original curve 116 to minimize or eliminate the shocks 124 associated with the original airfoil. As shown in FIG. 2, eliminating the shocks 124 results in the modified curve 120 exhibiting a transfer in lift from the upper surface to the lower surface of the modified airfoil.

Figure 3:
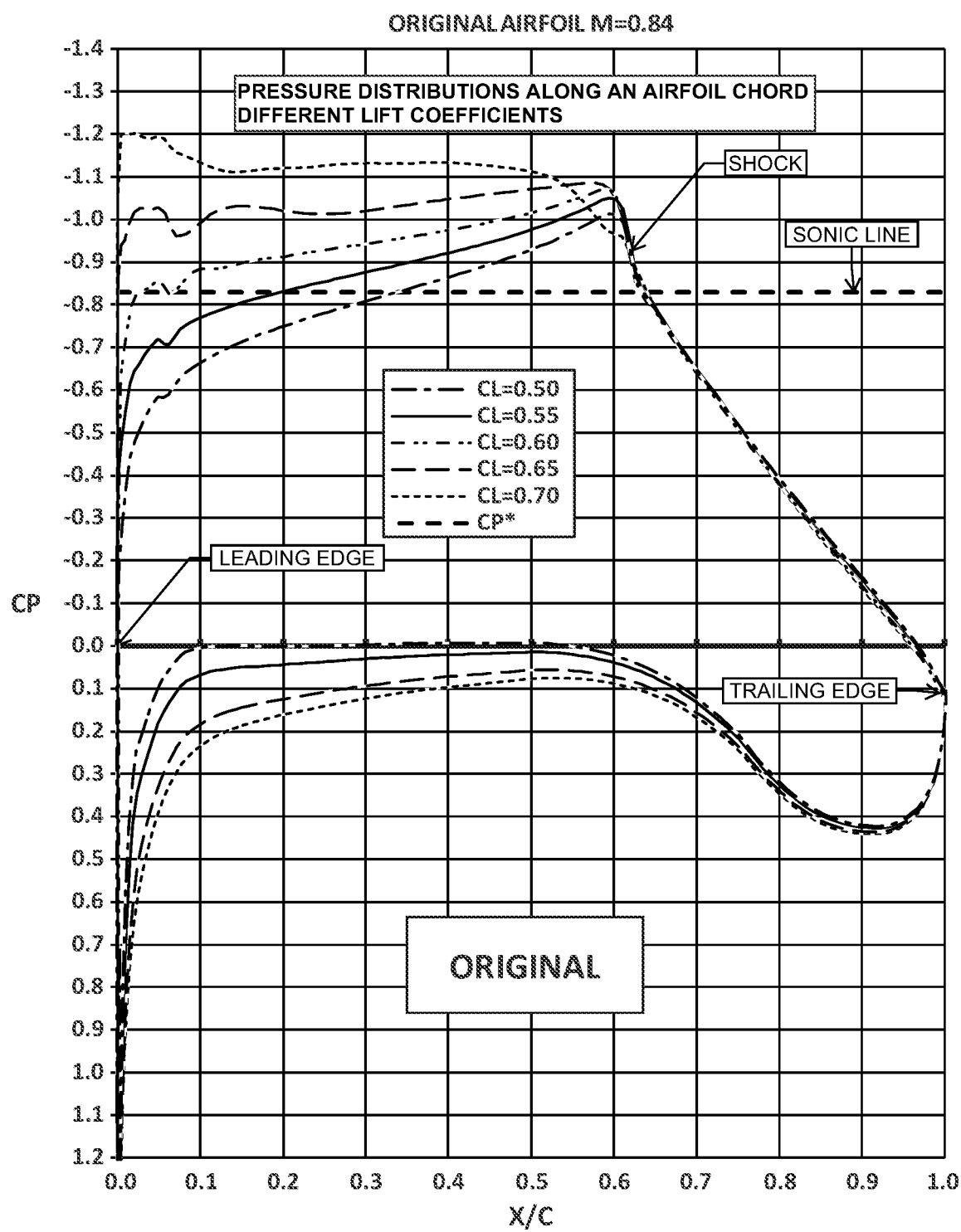
FIG. 3 is a graph illustrating multiple pressure distributions along a chord of the original airfoil having different lift coefficients.
Figure 4:
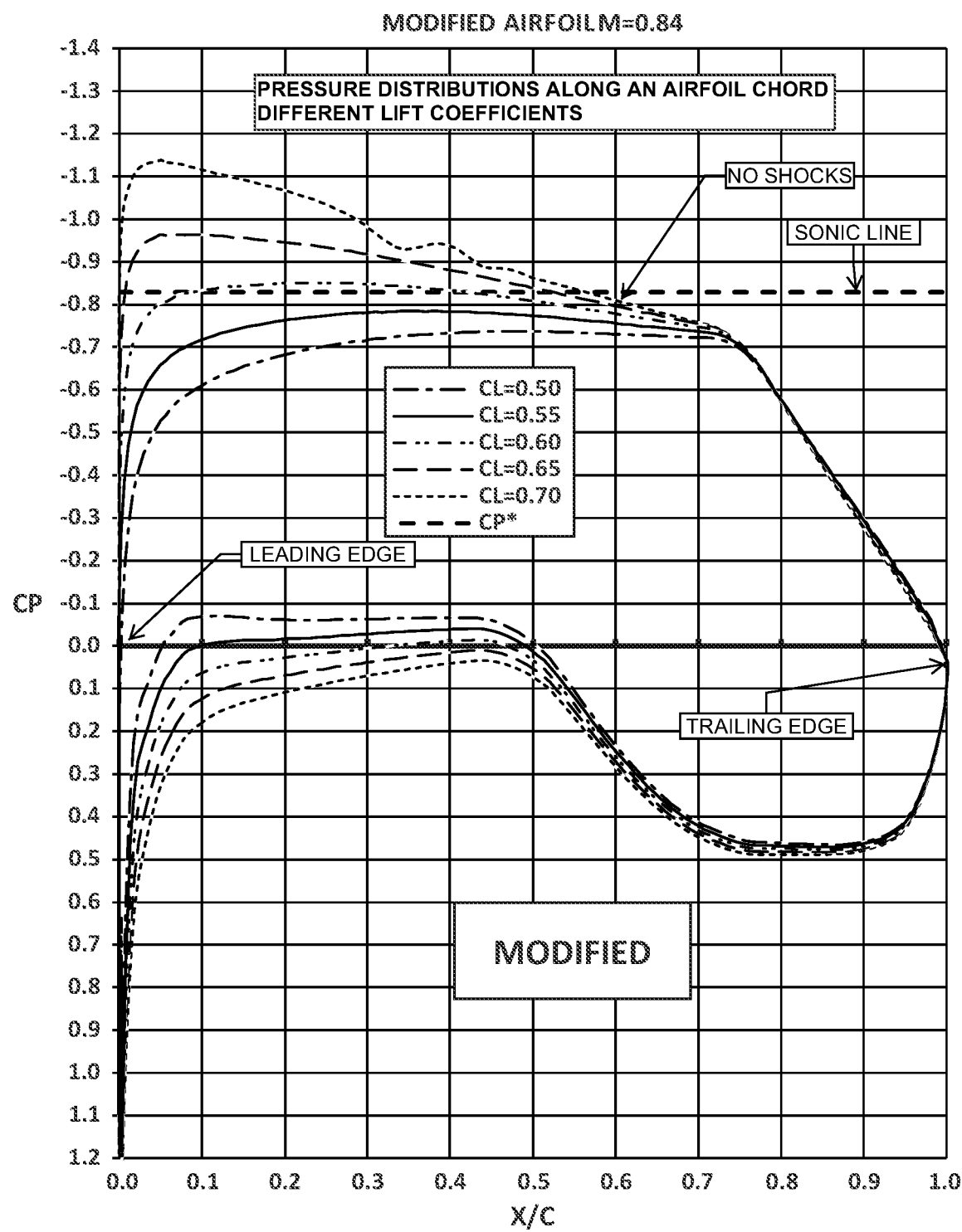
FIG. 4 is a graph illustrated multiple pressure distributions along a chord of the modified airfoil having the different lift coefficients of FIG. 3.

In some embodiments, the method provided herein may include analyzing the original airfoil and the modified airfoil for multiple values of the coefficient of lift. For example, FIG. 3 illustrates a multiplicity of pressure distribution curves along the chord of the original airfoil, at the first Mach speed, M=0.84. Each pressure distribution curve corresponds to a specific value of the coefficient of lift. As such, FIG. 3 shows sections of span stations that may be improved by way of modifications to the airfoil that correspond to the modified curve 108, shown in FIG. 1. Accordingly, FIG. 4 illustrates a multiplicity of pressure distribution curves along the chord of the modified airfoil corresponding to the specific values of the coefficient of lift shown in FIG. 3. As will be appreciated, FIG. 4 generally shows that the modified airfoil exhibits an absence of the shocks produced by the original airfoil shown in FIG. 3.

Figure 5:
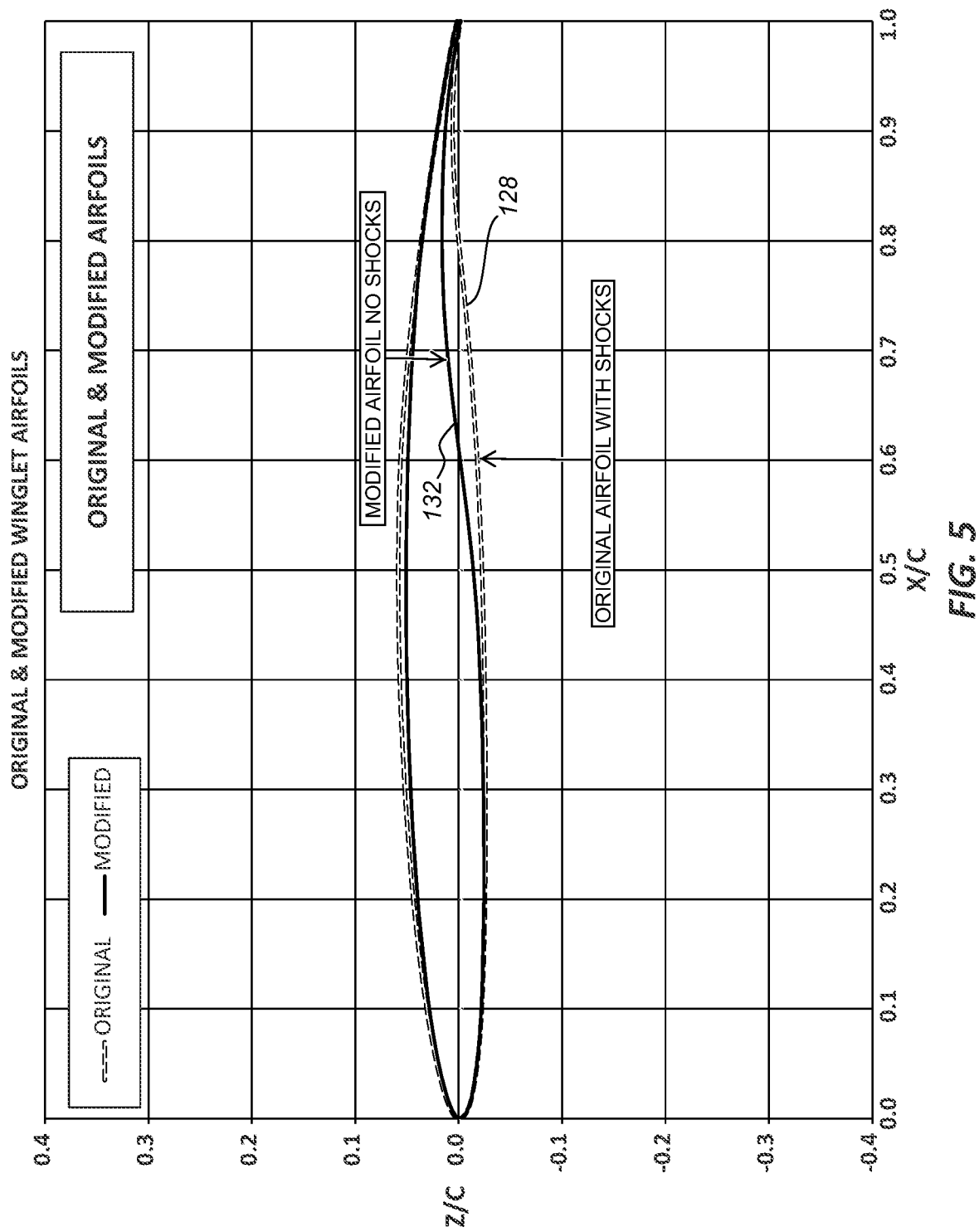
FIG. 5 is a graph illustrating an overlay of geometry of the original airfoil and the modified airfoil.

In some embodiments, the method provided herein may include using the modified curve, such as either of curves 108 and 120, to derive a geometry of the modified airfoil. For example, FIG. 5 illustrates an overlay of an original airfoil geometry 128 and a modified airfoil geometry 132 that are respectively generated by way of the curves 104, 108. It is straightforward to see that the modified airfoil geometry 132 is substantially different than the original airfoil geometry 128. As such, it is contemplated that modified airfoil geometry 132 produced by way of the modified curve 108 will exhibit an absence of the shocks 112 produced by the original airfoil shown in FIG. 1.

Figure 6:
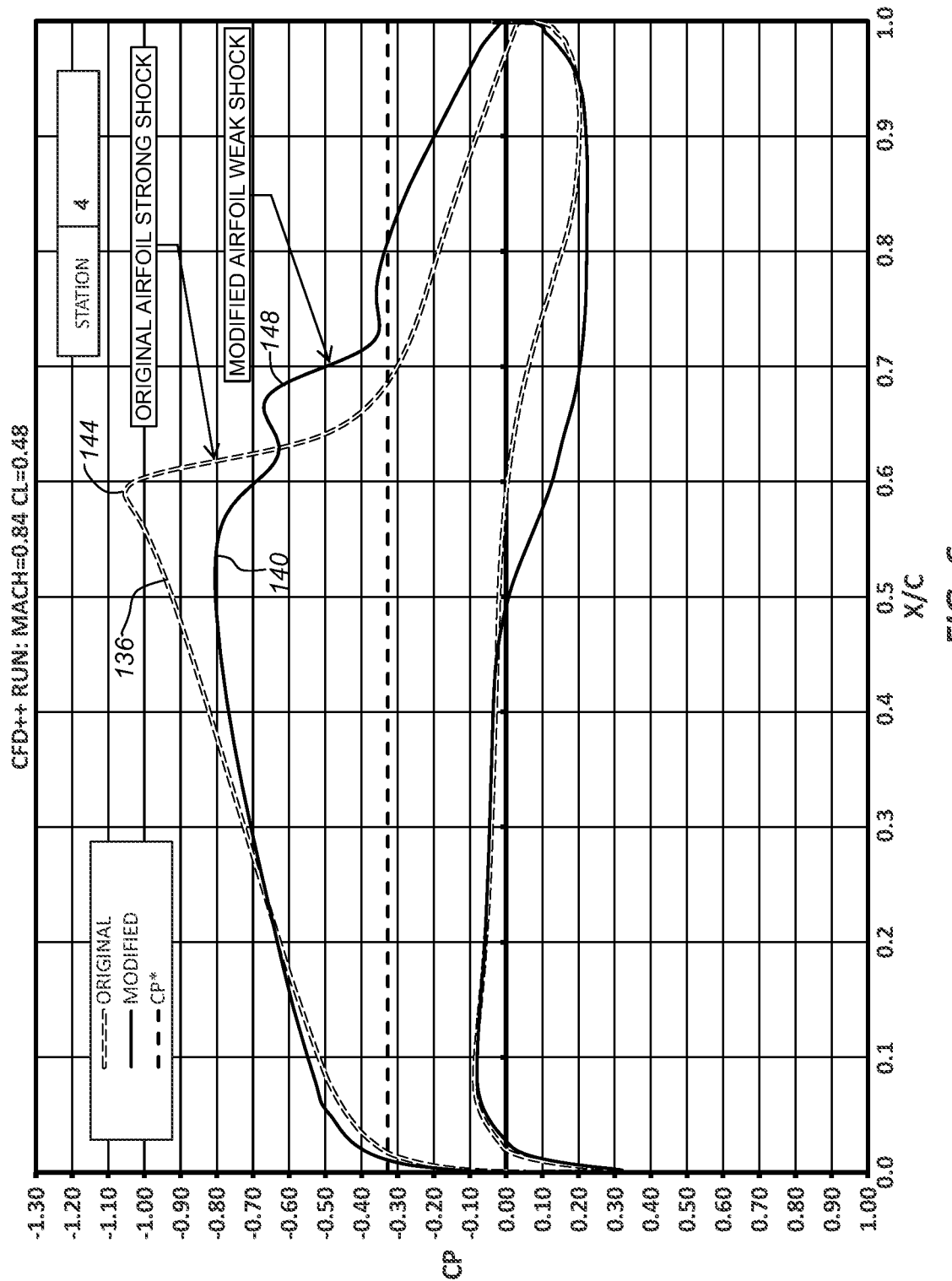
FIG. 6 is a graph illustrating performance data for a blended winglet that includes the modified airfoil of FIG. 5 with full airplane geometry.

In some embodiments, the method provided herein may include incorporating the modified airfoil geometry 132 into a blended winglet and then analyzing the resulting combined geometry in the presence of interference at a desired cruising Mach speed. FIG. 6 is a graph illustrating an overlay of performance data, obtained by way of running CFD++ code, for a blended winglet that includes the original airfoil geometry 128 and the modified airfoil geometry 132, with full airplane geometry. The performance data shown comprises an original pressure distribution curve 136, corresponding to the original airfoil geometry 128, and a modified pressure distribution curve 140 that includes the modified airfoil geometry 132. As shown in FIG. 6, the original airfoil geometry 128 is associated with strong shocks 144, while the modified airfoil geometry 132 produces relatively weaker shocks 148. It is straightforward to see, therefore, that the analyzing the modified curve 108 according to the method herein gives rise to an airfoil geometry that generally weakens the shocks 148 acting on the blended winglet and thus results in reduced overall drag and better fuel efficiency.

Figure 7:
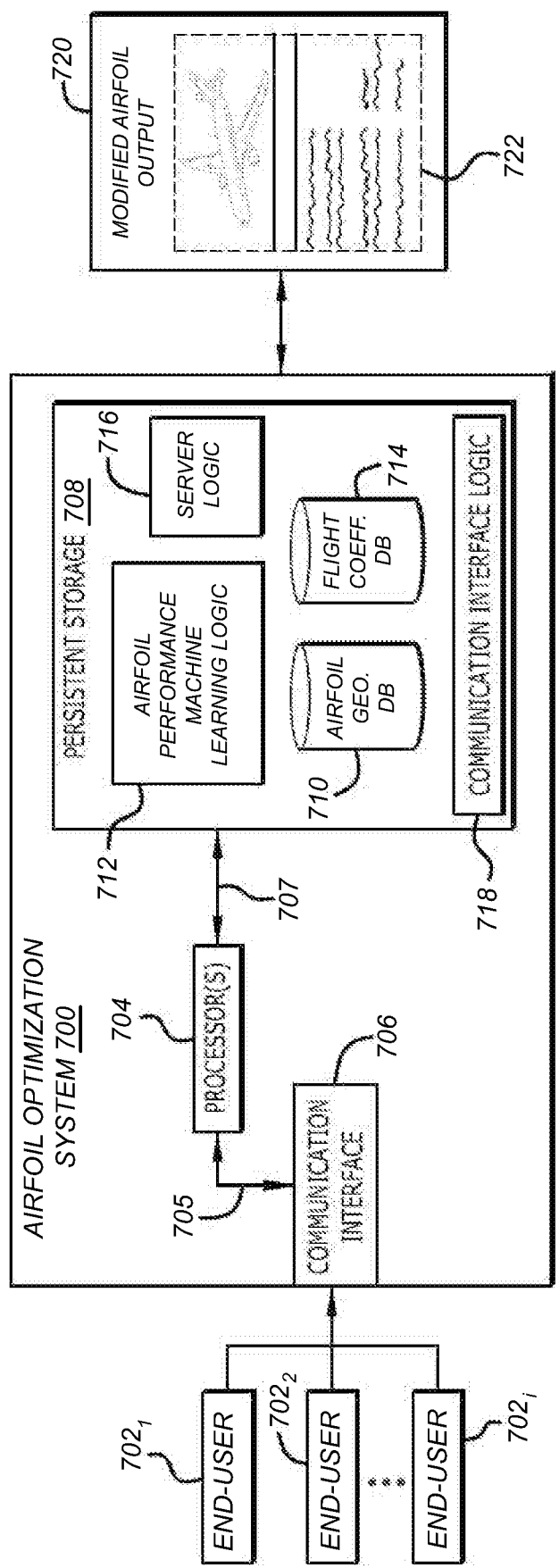
FIG. 7 illustrates an exemplary embodiment of a logical representation of an airfoil optimization system that is configured to dynamically analyze airfoil geometries in the presence of various interference conditions.

FIG. 7 illustrates an exemplary embodiment of a logical representation of an airfoil optimization system 700 that is configured to dynamically analyze airfoil geometries in the presence of various interference conditions, as described hereinabove. The airfoil optimization system 700, in one embodiment, may be stored on a non-transitory computer-readable storage medium of a server device that includes a housing, which is made entirely or partially of a hardened material (e.g., hardened plastic, metal, glass, composite or any combination thereof) that protects the circuitry within the housing, namely one or more processor(s) 704 that are coupled to a communication interface 706 via a first transmission medium 705. The communication interface 706, in combination with a communication interface logic 718, enables communications with external network devices, such as network devices of end-users $702_1$-$702_i$, which may display, for example, a website 720 that includes a graphical user interface (GUI) 722. Additionally, in some embodiments, as illustrated in FIG. 1 by way of a dotted box, the end-users $702_1$-$702_i$ may optionally provide airfoil flight performance data to the airfoil optimization system 700 by way of a flight data provider (e.g., a backend intermediary company). For example, a flight data provider may perform physical testing of flight characteristics of airfoils and then transmit the flight data to the airfoil optimization system 700. In other embodiments, however, the end-users $702_1$-$702_i$ may input their own airfoil performance data directly to the airfoil optimization system 700, such as by way of the GIU 722.

According to one embodiment of the disclosure, the communication interface 706 may be implemented as a physical interface including one or more ports for wired connectors. Additionally, or in the alternative, the communication interface 706 may be implemented with one or more radio units for supporting wireless communications with other electronic devices. The communication interface logic 718 may include logic for performing operations of receiving and transmitting electronic data via the communication interface 706 to enable communication between the airfoil optimization system 700 and network devices via a network (e.g., the internet) and/or cloud computing services.

The processors 704 are further coupled to a persistent storage 708 via a second transmission medium 707. According to one embodiment of the disclosure, the persistent storage 708 may include, an airfoil geometry data store 710, an airfoil performance machine learning logic 712, a flight configuration and coefficients data store 714, a server logic 716 and the communication interface logic 718. Of course, when implemented as hardware, one or more of these logic units may be implemented separately from each other.

In particular, the plurality of end-users $702_1$-$702_i$ may use the airfoil optimization system 700 by integrating logic, e.g., embedding a software code, into the website 720 that calls the server logic 716 when the website 720 is loaded by any of the end-users $702_1$-$702_i$. The airfoil optimization system 700 enables the end-users $702_1$-$702_i$, after loading the website 720, to select a specific airfoil geometry that is stored in the airfoil geometry data store 710 and view details pertaining to the airfoil geometry in order to analyze the flight performance of the specific airfoil. In particular, in response to receiving user input indicating a selection of a specific airfoil geometry, the embedded software code communicates with the server logic 716 to obtain information related to the specific airfoil geometry, e.g., coefficients of lift, drag, and pressure as well as airfoil profile images or graphical plots. The embedded software code is then able to render a display illustrating an airfoil profile image or plot of the selected airfoil and textual information describing the features included in the displayed airfoil. Exemplary embodiments of operations performed by the airfoil optimization system 700 are discussed in further detail below, along with specific details of the logic modules and data stores included within the airfoil optimization system 700.

With continuing reference to FIG. 1, it should be noted that a plurality of end-users $702_1$-$702_i$, may utilize the airfoil optimization system 700. For purposes of clarity, however, a single end-user, e.g., the end-user $702_1$, is discussed as utilizing the airfoil optimization system 700. First, the end-user $702_1$ obtains a set of airfoil performance data. The set of airfoil performance data may be obtained through, for example, a third-party that performs physical flight testing of airfoils, blended winglets, wings, and the like. Second, the airfoil optimization system 700 receives the airfoil performance data from the end-user $702_1$ and stores the airfoil performance data in the flight geometry data store 710.

Third, the general flow of operations performed by the airfoil optimization system 700 continues with an analysis of the airfoil performance data by the airfoil performance machine learning logic (ML) 712. The analysis performed by the airfoil performance ML logic 712 results in an association of each airfoil with corresponding flight characteristics, e.g., an assignment of any one or more of a coefficient of lift (CL), a coefficient of drag (CD), and a coefficient of pressure (CP) to each of airfoil. More specifically, the airfoil optimization ML logic 712 applies a machine learning model previously generated by the airfoil optimization ML logic 712. The machine learning model is generated through supervised learning using a training set to generate a mapping function that represents an algorithm for mapping input data to an output (e.g., an airfoil geometry to a listing of flight characteristics or coefficients).

The application of the machine learning model to an airfoil geometry may include detection of points of interest using algorithms such as edge detection algorithms, corner detection algorithms, blob detection algorithms, feature description algorithms, and the like. As one example, a detected point of interest within an airfoil geometry may correspond to an edge of a pressure distribution along a chord of the airfoil geometry. The detected points of interest may be provided to the machine learning model, which represents a correlation to the airfoil geometry comprising the training set used in generating the machine learning model.

In one embodiment, the results of the detection of points of interest may be used by the airfoil performance ML logic 712 to determine a classification ID to be assigned to the airfoil geometry (e.g., the classification ID being an alphanumeric notation), with the assigned classification ID indicating one or more features pertaining to the airfoil geometry. In a second embodiment, the airfoil performance ML logic 712 may utilize detected points of interest to determine a set of one or more features pertaining to the airfoil geometry, which is then compared to one or more datasets (e.g., tables or other data storage mechanisms) in order to determine the classification ID to be assigned to the airfoil geometry.

As one example, the airfoil performance ML logic 712 may assign one of a plurality of classification IDs to an airfoil geometry, with some classification IDs specifying, among others, "coefficient of lift," "coefficient of drag," "coefficient of pressure," "chord length," "airfoil camber," "leading-edge profile," "trailing-edge profile," and the like. Additionally, the assignment of classification IDs to each portion of the airfoil geometry may be predetermined and performed upon, or prior to, storage of portions of flight performance data in the flight characteristic and coefficients data store 714, as discussed below.

Fourth, upon assignment of a classification ID to each of airfoil geometry, the airfoil geometries and their corresponding classification IDs are again stored in the airfoil geometry data store 710. Fifth, the flight characteristics and coefficients data store 714 stores flight performance data, which includes, at least, coefficients of lift, drag, and pressure. It is contemplated that each portion of the flight performance data comprises information describing a flight characteristic or view and is assigned the classification ID corresponding to the classification IDs assigned to the airfoil geometries associated with the flight characteristic or view. In one embodiment, the flight performance data portions may comprise textual information.

Sixth, the general flow of operations performed by the airfoil optimization system 700 continues via as the software code embedded in the website 720 receives end-user input. Specifically, when an end-user 702$_1$ visits the website 720, the website 720 is loaded via an internet browser over an internet connection. Additionally, the software code embedded into the source code of the website 720, not shown, initiates communication with the server logic 716 and renders the GUI 722 on a portion of the web site 720. The software code receives end-user input indicating a selection of a specific airfoil geometry through the GUI 722. In response to receiving the end-user input, the software code passes a set of parameters to the server logic 716, which may include, an airfoil identifier of the selected airfoil geometry.

Seventh, in response to receiving parameters indicating the selection of a specific airfoil geometry, the server logic 716 determines the flight performance data associated with the airfoil geometry. In one embodiment, the server logic 716 queries the flight characteristics and coefficients data store 714 to retrieve a listing of all flight performance data related to the selected airfoil geometry. Additionally, the server logic 716 may retrieve an image of the selected airfoil geometry. In a similar manner as with respect to the flight performance data, the server logic 716 may query the airfoil geometry data store 710 to retrieve the image of the selected airfoil geometry. Further, the server logic 716 may match the flight performance data of the airfoil geometry with one or more portions of flight performance data stored in the flight characteristics and coefficients data store 714 based on the classification IDs assigned to each of the airfoil geometries and the portions of the flight performance data. More particularly, the server logic 716 (i) queries the airfoil geometry data store 710 for the airfoil images corresponding to the selected airfoil geometry, and (ii) queries the flight characteristic and coefficients data store 714 for the flight performance data that corresponds to the selected airfoil geometry.

The server logic 716 then generates an image-to-feature association that maps the retrieved flight performance data to the airfoil image illustrating corresponding features and/or views based on the one or more classification IDs to each of the airfoil geometries and portions of flight performance data. For example, in one embodiment, an airfoil image may illustrate multiple flight performance features each corresponding to a single classification ID, such that the airfoil image will be associated with a single classification ID. In another embodiment, a first flight performance feature and a second flight performance feature may be illustrated in the airfoil image and assigned a first and second classification ID, respectively, such that the airfoil image is associated with multiple classification IDs. The image-to-feature association provides an association of: (i) an airfoil image, (ii) one or more flight performance features, and (iii) one or more classification IDs. The server logic 716 then transmits the image-to-feature association for the airfoil geometry to the software code along with the airfoil image and corresponding flight performance feature content. Finally, eighth, upon receiving the image-to-feature association from the server logic 716, the software code references the image-to-feature association, which instructs the software as to which airfoil image to display in the GUI 722.

In one embodiment, when providing input to select an airfoil geometry, the end-user also selects a view or feature of the airfoil, e.g., a "cross-sectional view." For example, in order to determine an airfoil image to display and the corresponding classification ID, the software code compares the selected feature or view to a dataset, e.g., a table storing features/views and the corresponding classification IDs, that indicates a classification ID corresponding to each feature and/or view. In one embodiment, the dataset may be stored in the persistent storage 708 and provided by the server logic 716 with the image-to-feature association. In an alternative embodiment, the dataset may be included within the software code. In yet another embodiment, a default view is used by the software code for an initial rendering of the display of the selected airfoil geometry.

By comparing consumer input or the default view to the dataset, the software may determine the classification ID of the selected feature or view, which enables the software to display one or more portions of feature content based on the image-to-feature association. Upon determining the classification ID, the software causes the rendering of the airfoil image and one or more portions of feature content that correspond to the determined one or more classification IDs, with the rendering occurring within the GUI 722 of the website 720. As the end-user selects a second feature or view for display, the software again references the image-to-feature association for instruction as to which airfoil image and portions of feature content to render.

Figure 8:
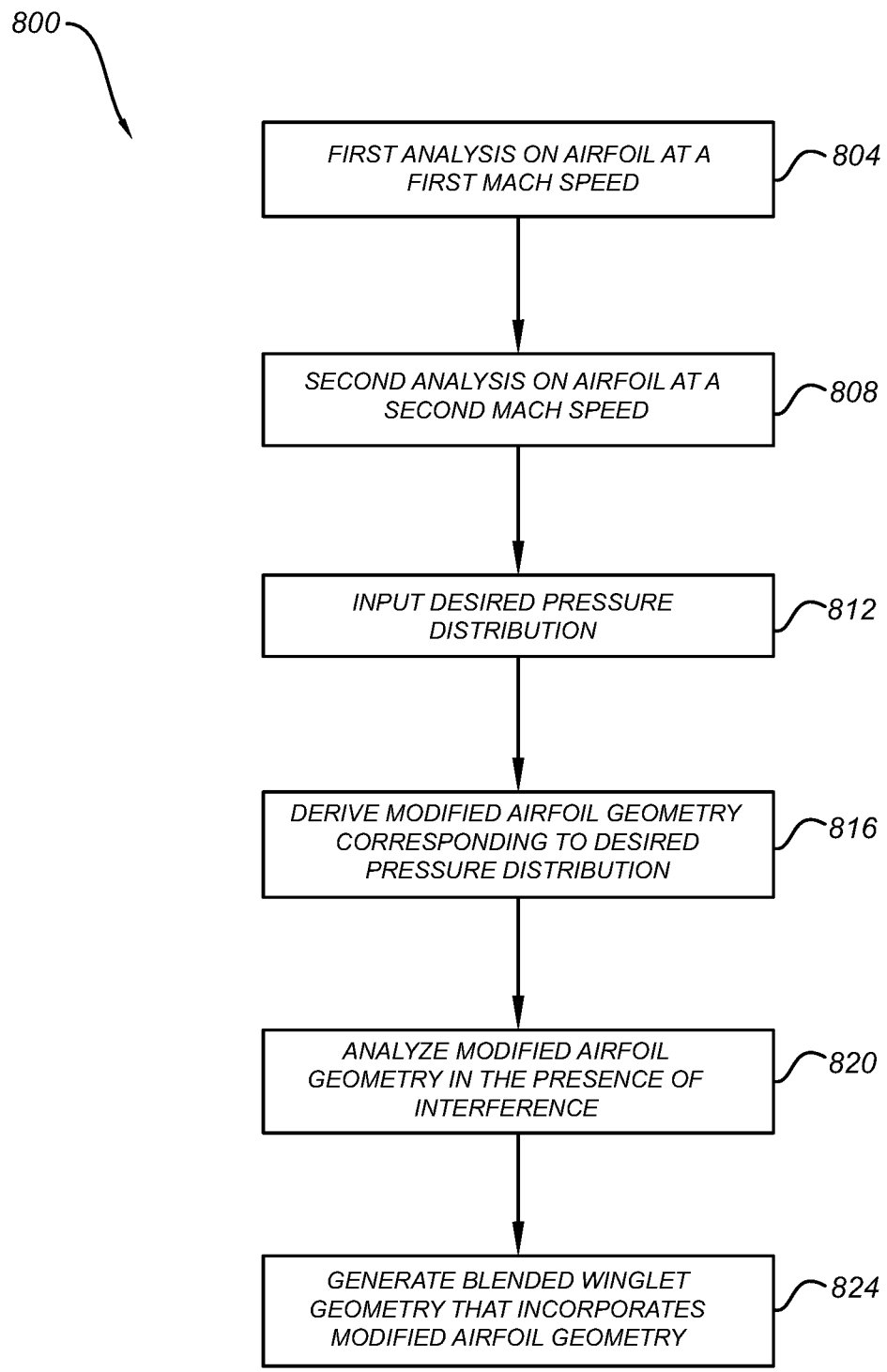
FIG. 8 is a schematic illustrating an exemplary embodiment of a process for generating a blended winglet geometry that incorporates a modified airfoil geometry.

FIG. 8 is a schematic illustrating an exemplary embodiment of a process 800 for performing any of the methods described herein for generating blended winglet geometries that incorporate modified airfoil geometries. The process 800 begins at a block 804 wherein an end-user selects an existing, original airfoil and corresponding flight performance data to display, such as by way of the website 720. The end-user may specify one or more performance criteria, such as a coefficient of lift and a first Mach speed, as described in connection with FIG. 1. The corresponding flight performance data displayed may include the original curve 104 representing the pressure distribution along the chord of the original airfoil, as shown in FIG. 1. As will be appreciated, the original curve 104 is dependent upon the flight performance data associated with the selected airfoil geometry.

Once the analysis of the airfoil geometry described above (block 804) is finished, a second analysis may be performed on the airfoil geometry, but at a different cruise Mach speed (block 808). For example, the second analysis may be performed with a second Mach speed that is increased by about +0.04 over the first Mach. Similar to the first analysis, performed at block 804, the second analysis may include the original curve 116 representing the pressure distribution along the chord of the original airfoil, as shown in FIG. 2. As will be appreciated, any shocks 124 produced by the original airfoil at the second Mach speed are likely to be relatively more pronounced than the shocks 112 produced at the first Mach speed of FIG. 1.

At a block 812, the original curve analyzed in either of blocks 804, 808 may be manipulated to obtain a modified curve that exhibits improved flight characteristics as compared to the original curve. For example, in block 804 the original curve 104 may be manipulated to obtain the modified curve 108 of FIG. 1 so as to minimize or eliminate shocks 112 associated with the original airfoil. In block 808, however, the original curve 116 may be altered to eliminate the shocks 124, thus producing the modified curve 120. As will be appreciated, altering the original curve to eliminate the shocks generally results in the modified curve including a reduction in lift due to the upper surface and an equal increase in lift due to the lower surface of the modified airfoil.

Once analyzing the original airfoil and obtaining a modified airfoil is completed, the process 800 advances to block 816, wherein the modified curve, such as either of curves 108 and 120, may be used to derive a geometry of the modified airfoil. For example, an overlay of an original airfoil geometry 128 and a modified airfoil geometry 132 that are respectively generated by way of the curves 104, 108 is discussed with respect to FIG. 5. It is contemplated that the modified airfoil geometry 132 exhibits an absence of the shocks 112 produced by the original airfoil geometry 128.

Once the modified airfoil geometry 132 is obtained in block 816, the modified airfoil geometry 132 may be incorporated into a blended winglet and the resulting combined geometry analyzed in the presence of interference at a desired cruising Mach speed in block 820. For example, FIG. 6 shows an overlay of performance data, obtained by way of running CFD++ code, for a blended winglet that includes the original airfoil geometry 128 and the modified airfoil geometry 132, with full airplane geometry. As shown in FIG. 6, the original airfoil geometry 128 is associated with strong shocks 144, while the modified airfoil geometry 132 produces relatively weaker shocks 148. Once the modified airfoil geometry is found to perform as desired, the combined geometry of the blended winglet and the modified airfoil geometry may be used, in block 824, to fabricate a modified blended winglet that exhibits generally weakened shocks and thus results in reduced overall drag and better fuel efficiency.

Figure 9:
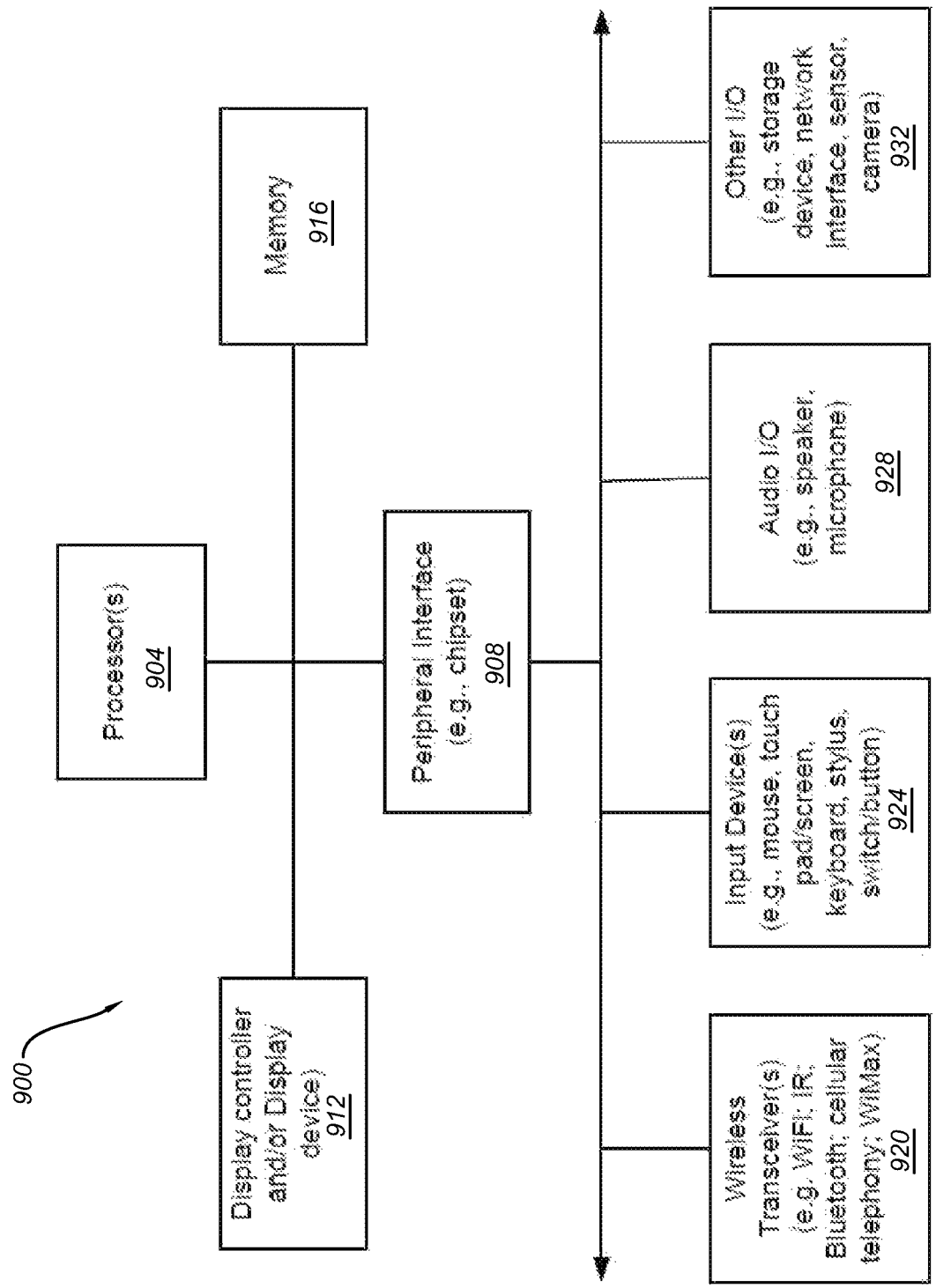
FIG. 9 is a block diagram illustrating an exemplary data processing system that may be used with an airfoil optimization system according to the present disclosure.

FIG. 9 is a block diagram illustrating an exemplary data processing system 900 that may be used with the airfoil optimization system 700 to perform any of the processes or methods described herein. System 900 may represent a desktop, a tablet, a server, a mobile phone, a media player, a personal digital assistant (PDA), a personal communicator, a network router or hub, a wireless access point (AP) or repeater, a set-top box, or a combination thereof.

In an embodiment, illustrated in FIG. 9, system 900 includes a processor 904 and a peripheral interface 908, also referred to as a chipset, to couple various components to the processor 904, including a memory 916 and devices 920-932 by way of a bus or an interconnect. Processor 904 may represent a single processor or multiple processors with a single processor core or multiple processor cores included therein. Processor 904 may represent one or more general-purpose processors such as a microprocessor, a central processing unit (CPU), and the like. More particularly, processor 904 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 904 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 904 is configured to execute instructions for performing the operations and steps discussed herein.

Peripheral interface 908 may include a memory control hub (MCH) and an input output control hub (ICH). Peripheral interface 908 may include a memory controller (not shown) that communicates with a memory 916. The peripheral interface 908 may also include a graphics interface that communicates with graphics subsystem 912, which may include a display controller and/or a display device. The peripheral interface 908 may communicate with the graphics device 912 by way of an accelerated graphics port (AGP), a peripheral component interconnect (PCI) express bus, or any other type of interconnects.

An MCH is sometimes referred to as a Northbridge, and an ICH is sometimes referred to as a Southbridge. As used herein, the terms MCH, ICH, Northbridge and Southbridge are intended to be interpreted broadly to cover various chips that perform functions including passing interrupt signals toward a processor. In some embodiments, the MCH may be integrated with the processor 904. In such a configuration, the peripheral interface 908 operates as an interface chip performing some functions of the MCH and ICH. Furthermore, a graphics accelerator may be integrated within the MCH or the processor 904.

Memory 916 may include one or more volatile storage (or memory) devices, such as random access memory (RAM), dynamic RAM (DRAM), synchronous DRAM (SDRAM), static RAM (SRAM), or other types of storage devices. Memory 916 may store information including sequences of instructions that are executed by the processor 904, or any other device. For example, executable code and/or data of a variety of operating systems, device drivers, firmware (e.g., input output basic system or BIOS), and/or applications can be loaded in memory 916 and executed by the processor 904. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 908 may provide an interface to IO devices, such as the devices 920-932, including wireless transceiver(s) 920, input device(s) 924, audio IO device(s) 928, and other IO devices 932. Wireless transceiver 920 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 924 may include a mouse, a touch pad, a touch sensitive screen (which may be integrated with display device 912), a pointer device such as a stylus, and/or a keyboard (e.g., physical keyboard or a virtual keyboard displayed as part of a touch sensitive screen). For example, the input device 924 may include a touch screen controller coupled with a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 928 may include a speaker and/or a microphone to facilitate voice-enabled functions, such as voice recognition, voice replication, digital recording, and/or telephony functions. Other optional devices 932 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 932 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 9 illustrates various components of a data processing system, it is not intended to represent any particular architecture or manner of interconnecting the components; as such details are not germane to embodiments of the present disclosure. It should also be appreciated that network computers, handheld computers, mobile phones, and other data processing systems, which have fewer components or perhaps more components, may also be used with embodiments of the invention disclosed hereinabove.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it should be appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A computerized method for optimizing an airfoil, comprising:
    performing a first analysis, by way of a first logic module, on the airfoil at a first Mach speed, the first analysis including:
    selecting the first Mach speed to be a speed at which the airfoil generates shocks; and
    determining a pressure distribution on an upper surface and a lower surface of the airfoil at the first Mach speed;
    performing a second analysis, by way of a second logic module, on the airfoil at a second Mach speed, the second analysis including:

selecting the second Mach speed to be greater than the first Mach speed; and determining a pressure distribution on the upper surface and the lower surface of the airfoil at the second Mach speed;

receiving input, by way of an inverse analysis logic module, indicating a desired pressure distribution at the second Mach speed and specifying a pressure distribution curve on the upper surface and the lower surface of the airfoil such that the pressure distribution curve is shock-free at the second Mach speed, the pressure distribution curve utilizing one or more resultant values of second analysis;

performing an inverse analysis, by way of the inverse analysis logic module, to derive a modified airfoil geometry corresponding to the desired pressure distribution;

performing a third analysis, by way of a third logic module, on the modified airfoil geometry in the presence of interference at the first Mach speed, the third analysis including:

performing a pressure distribution analysis on a blended winglet that includes the modified airfoil geometry; and running a CFD++ code; and generating a blended winglet geometry that incorporates the modified airfoil geometry.

2. The method of claim 1, wherein selecting the second Mach speed to be greater than the first Mach speed comprises selecting the second Mach speed to be substantially +0.04 greater the first Mach speed.

3. The method of claim 1, wherein performing the first analysis includes obtaining values for any one or more of a coefficient of lift (CL), a coefficient of drag (CD), and a coefficient of pressure (CP) at the first Mach speed.

4. The method of claim 1, wherein performing the second analysis includes obtaining values for any one or more of a coefficient of lift (CL), a coefficient of drag (CD), and a coefficient of pressure (CP) at the second Mach speed.

5. The method of claim 1, wherein the one or more resultant values comprise any one or more of a coefficient of lift (CL), a coefficient of drag (CD), and a coefficient of pressure (CP) at the second Mach speed.

6. The method of claim 1, wherein performing the third analysis comprises running the CFD++ code with the blended winglet incorporated into a full airplane geometry.

7. A method for optimizing a winglet airfoil, comprising:
performing an analysis on the winglet airfoil at a first Mach number to determine at least a coefficient of lift (CL), a coefficient of drag (CD), and a coefficient of pressure (CP) at the first Mach number, the analysis on the winglet airfoil at the first Mach number including:
selecting the first Mach number to be a speed at which the winglet airfoil generates shocks; and
determining a pressure distribution on an upper surface and a lower surface of the winglet airfoil at the first Mach number;
performing an analysis on the winglet airfoil at a second Mach number greater than the first Mach number to determine at least the coefficient of lift (CL), the coefficient of drag (CD), and the coefficient of pressure (CP) at the second Mach number, the analysis on the winglet at the second Mach number including determining a pressure distribution on the upper surface and the lower surface of the winglet airfoil at the second Mach number;

selecting a pressure distribution curve at the second Mach number on the upper surface and the lower surface of the winglet airfoil such that the pressure distribution curve is shock-free at the second Mach number, the pressure distribution curve utilizing one or more resultant values of analysis on the winglet airfoil at the second Mach number;

running an inverse pressure distribution from the pressure distribution curve to generate geometry for a modified winglet airfoil; and performing an analysis on the modified winglet airfoil in the presence of interference at the first Mach number, comprising:

performing a pressure distribution analysis on a blended winglet that includes the modified winglet airfoil; and running a CFD++ code.

8. The method of claim 7, further comprising subjecting the modified winglet airfoil to interference at the first Mach number.

9. A system for optimizing an airfoil, comprising:
a memory to store executable instructions; and
a processing device coupled with the memory, wherein the executable instructions, when executed by the processing device, cause operations including:
performing, by a first logic module, a first analysis on the airfoil at a first Mach speed, the first analysis including:
selecting the first Mach speed to be a speed at which the airfoil generates shocks; and
determining a pressure distribution on an upper surface and a lower surface of the airfoil at the first Mach speed;
performing, by a second logic module, a second analysis on the airfoil at a second Mach speed, the second analysis including:
selecting the second Mach speed to be greater than the first Mach speed; and
determining a pressure distribution on the upper surface and the lower surface of the airfoil at the second Mach speed;
receiving, by an inverse analysis logic module, input indicating a desired pressure distribution at the second Mach speed and specifying a pressure distribution curve on the upper surface and the lower surface of the airfoil such that the pressure distribution curve is shock-free at the second Mach speed, the pressure distribution curve utilizing one or more resultant values of second analysis;
performing, by the inverse analysis logic module, an inverse analysis to derive a modified airfoil geometry corresponding to a desired pressure distribution; and
performing, by a third logic module, a third analysis on the modified airfoil geometry in the presence of interference at the first Mach speed, the third analysis including:
performing a pressure distribution analysis on a blended winglet that includes the modified airfoil geometry; and
running a CFD++ code.

10. The system of claim 9, wherein the second Mach speed is substantially +0.04 greater the first Mach speed.

11. The system of claim 9, wherein the third analysis comprises running the CFD++ code with the blended winglet incorporated into a full airplane geometry.

* * * * *